UNITED STATES PATENT OFFICE.

AUGUSTE TIXIER, OF PARIS, FRANCE, ASSIGNOR TO LES PRODUITS CHIMIQUE DE CROISSY
(J. BASLER & CO.), OF PARIS, FRANCE.

PREPARATION OF CAOUTCHOUC.

No. 924,117.  Specification of Letters Patent.  Patented June 8, 1909.

Application filed November 30, 1906. Serial No. 345,618.

*To all whom it may concern:*

Be it known that I, AUGUSTE TIXIER, chemist, of 82 Rue St. Lazare, Paris, in the Republic of France, have invented certain new and useful Improvements in the Preparation of Caoutchouc, of which the following is a specification.

This invention relates to the preparation of caoutchouc from rubber waste, crude rubber or other materials containing caoutchouc, and to the purification and improvement of the quality of caoutchouc.

I have discovered that terpineol, (either of the liquid or solid variety, and whether obtained from essential oils, or by synthetical manufacture), and other oxygen derivatives of the terpinic hydrocarbons analogous to terpineol, said derivatives having a melting point below 150 degrees C. possess a remarkable solvent power on caoutchouc, which they dissolve slowly in the cold, but more rapidly with the aid of heat; and I have further discovered that caoutchouc may be recovered from its terpineol solution in a high state of purity, possessing the requisite qualities of suppleness and elasticity, and capable of being vulcanized.

By the employment of terpineol or such other analogous oxygen derivative of the terpinic hydrocarbons as a solvent for the purpose stated, which is the essential feature of my invention, I am able to prepare concentrated solutions of caoutchouc at moderately low temperatures, the characteristic physical qualities of the caoutchouc obtained being unaffected, while impurities such as mineral matters, tissues and the like insoluble in terpineol or the like can be removed by filtration or decantation. Other impurities which are likewise soluble in terpineol or the like can be removed by adding liquids miscible with terpineol and which precipitate impurities without precipitating the caoutchouc, or conversely by adding liquids miscible with terpineol which precipitate the caoutchouc and leave impurities in solution. Or I may combine both methods for the removal of soluble impurities by adding both orders of precipitating agents and removing the precipitates in succession.

Of the first order of precipitating agents benzene is the type, and of the second order alcohol or acetone; but I do not limit my invention to the employment of these specific precipitating agents, which are merely cheap and convenient types. The selection of the precipitating agent and the exact order of procedure to be followed depend, as will be readily understood, on the nature and quantity of impurities present.

By dissolving the waste or impure rubber or other material containing caoutchouc in terpineol or the like as described and separating the caoutchouc from dissolved impurities as explained, I am enabled to obtain a caoutchouc of great technical value free from substances which have existed in the best rubbers hitherto obtainable. These substances can be separated by the employment of the new menstruum as described.

As an example of the regeneration of caoutchouc from vulcanized rubber waste I proceed as follows:—The rubber scraps are reduced to a pulp by suitable mechanical means and then digested at a temperature of 100° to 150° C., in a closed digester provided with a stirring arrangement, with a sufficient quantity of terpineol say for example about two parts of terpineol to one part of scrap. When the solution of the caoutchouc is complete, 4 or 5 volumes of benzene are added preferably while the caoutchouc solution is in the digester and thoroughly stirred, and the mixture is then either filtered or left to precipitate and the clear liquid decanted off. From the clear liquors the benzene is removed by distillation and to the gummy terpineol solution alcohol or acetone is added, with constant stirring, until the whole of the caoutchouc is precipitated as a gummy homogeneous mass. The liquid is poured off, and the mass washed with the caoutchouc precipitating agent until it is free from terpineol, and it is finally washed with warm water and dried. The caoutchouc thus obtained can be vulcanized and loaded or not in the usual way, according to requirement.

The terpineol or the like and the alcohol or other precipitating agent employed can be recovered by distillation and returned to the manufacture.

The terpineol or other oxygen derivative of the terpinic hydrocarbons employed as a caoutchouc solvent as before described has the effect of devulcanizing the caoutchouc when waste rubber or vulcanized caoutchouc is treated, and the process is therefore correspondingly valuable in this respect.

The purification of caoutchouc by the invention will be understood from the foregoing description, the caoutchouc to be purified being subjected to substantially similar treatment.

In carrying out my invention for the recovery or preparation of caoutchouc I may also incorporate for the purpose of improving the quality of the caoutchouc or giving it a special character, gums, such as copal, or like substances which are soluble in terpineol or oxygen terpinic derivatives analogous thereto. For this purpose a solution of these substances in terpineol or the like may be added to the terpineol or like solution of caoutchouc before precipitation of the latter.

What I claim and desire to secure by Letters Patent is:—

1. A process of preparing caoutchouc, comprising extraction of material containing the same with an oxygen derivative of a terpinic hydrocarbon said derivative having a melting point below 150 degrees C.

2. A process of preparing caoutchouc from rubber waste, comprising extraction of said waste with an oxygen derivative of a terpinic hydrocarbon said derivative having a melting point below 150 degrees C.

3. A process of preparing caoutchouc from material containing the same, comprising the extraction of said material with an oxygen derivative of a terpinic hydrocarbon said derivative having a melting point below 150 degrees C. and separation of the caoutchouc from other dissolved matter in the solution by a liquid precipitating agent miscible with said derivative.

4. A process of preparing caoutchouc from material containing the same, comprising extraction of said material with an oxygen derivative of a terpinic hydrocarbon said derivative having a melting point below 150 degrees C. and separation of the caoutchouc from other dissolved matter in the solution by a liquid caoutchouc precipitating agent miscible with said derivative.

5. A process of preparing caoutchouc from rubber waste, comprising extraction of said waste with an oxygen derivative of a terpinic hydrocarbon, said derivative having a melting point below 150 degrees C. and separation of the caoutchouc from other dissolved matter in the solution by a liquid precipitating agent miscible with said derivative.

6. A process of preparing caoutchouc from rubber waste, comprising extraction of said waste with an oxygen derivative of a terpinic hydrocarbon, said derivative having a melting point below 150 degrees C. and separation of the caoutchouc from other dissolved matter in the solution by a liquid caoutchouc precipitating agent miscible with said derivative.

7. A process of preparing caoutchouc comprising the extraction of material containing the same with terpineol.

8. A method or process of preparing caoutchouc from rubber waste, comprising the extraction of said waste with terpineol.

9. A process of preparing caoutchouc from material containing the same, comprising the extraction of the material with terpineol, and separation of the caoutchouc from other dissolved matter in the terpineol solution by a liquid precipitating agent miscible with terpineol.

10. A process of preparing caoutchouc from rubber waste, comprising the extraction of the waste with terpineol, and separation of the caoutchouc from other dissolved matter in the terpineol solution by a liquid precipitating agent miscible with terpineol.

11. A process of preparing caoutchouc from material containing the same, comprising extraction of the material with terpineol and precipitation of the caoutchouc from the terpineol solution by a liquid precipitating agent miscible with terpineol.

12. A process of preparing caoutchouc from material containing the same comprising the extraction of the material with terpineol and precipitation of the caoutchouc from the terpineol solution by alcohol.

13. A process of preparing caoutchouc from rubber waste, comprising extraction of the waste with terpineol and precipitation of the caoutchouc from the terpineol solution by alcohol.

14. A process of obtaining caoutchouc from material containing the same, comprising extraction of the material with terpineol and precipitation of dissolved matter other than caoutchouc from the terpineol solution by a liquid precipitating agent miscible with terpineol.

15. A process of preparing caoutchouc from rubber waste, comprising extraction of the waste with terpineol and precipitation of dissolved matter other than caoutchouc from the terpineol solution by benzene.

16. A process of obtaining caoutchouc from material containing the same, comprising extraction of the material with terpineol and precipitation of dissolved matter other than caoutchouc from the terpineol solution by benzene.

17. A process of preparing caoutchouc from material containing the same, comprising extraction of the material with terpineol, precipitation of dissolved matter other than caoutchouc in the terpineol solution by a liquid precipitating agent miscible with terpineol, and subsequent precipitation of the caoutchouc by a liquid caoutchouc precipitating agent miscible with terpineol.

18. A process of preparing caoutchouc from rubber waste, comprising extraction of the waste with terpineol, precipitation of dissolved matter other than caoutchouc by benzene, distilling off the benzene and precipitating the caoutchouc with alcohol.

19. In a method or process of preparing caoutchouc from material containing the same by means of extraction with an oxygen derivative of a terpinic hydrocarbon, said derivative having a melting point below 150 degrees C. the addition to the caoutchouc solution of other gummy material soluble in said derivative.

20. In a method or process of preparing caoutchouc from material containing the same by means of extraction with terpineol, the addition to the terpineol solution of other gummy material soluble in terpineol.

21. In a method or process of preparing caoutchouc from rubber waste by means of extraction with terpineol, the addition to the terpineol solution of caoutchouc of a terpineol solution of copal.

22. As a new composition of matter, a solution of caoutchouc in an oxygen derivative of a terpinic hydrocarbon said derivative having a melting point below 150 degrees C.

23. As a new composition of matter, a solution of caoutchouc in terpineol.

24. As a new composition of matter, caoutchouc free from substances insoluble in a mixture of terpineol with benzene.

25. As a new composition of matter, vulcanized caoutchouc free from substances insoluble in a mixture of terpineol with benzene, other than the vulcanizing or a loading agent.

In witness whereof, I have hereunto signed my name in the presence of two subscribing witnesses.

AUGUSTE TIXIER.

Witnesses:
JOSEPH SIMSON,
JOSEPH BASLER.